Patented Feb. 13, 1945

2,369,197

UNITED STATES PATENT OFFICE 2,369,197

CATALYTIC PRODUCTION OF PHENOLIC COMPOUNDS

De Loss E. Winkler, Berkeley, and Seaver A. Ballard, Oakland, Calif., assignors to Shell Development Company, San Francisco, Calif., a corporation of Delaware No Drawing. Application March 23, 1943, Serial No. 480,260

9 Claims. (Cl. 260—621)

This invention relates to a process of producing aromatic hydroxylated compounds from non-aromatic cyclic ketonic compounds containing the same number of nuclear carbon atoms. More specifically, the invention pertains to a novel process for the manufacture of phenolic compounds from ketones containing a cyclic, particularly a mono-cyclic, non-aromatic nucleus of six carbon atoms. In one of its most specific embodiments, the present invention is directed to a process for the economic conversion of isophorone (3,5,5-trimethyl cyclohexene-2-one) to 3,5-xylenol (3,5-dimethyl phenol).

It is well known that phenolic compounds are very valuable and may be used, for instance, as solvents, disinfectants, intermediates for various chemical synthheses, etc. Also, they find utilization in the production of synthetic resins or plastics, in ore flotation processes, etc. For example, 3,5-dimethyl phenol is particularly suited for use in the manufacture of phenol-formaldehyde type resins because the formaldehyde may react with any and all of the three of the 2, 4 and 6 positions of the aromatic nucleus of the xylenol, while the alkyl radicals of the 3 and 5 positions of the xylenol increase the solubility of the formed resin in drying oils.

It is an object of the present invention to provide a practical and economical method for the technical scale conversion of non-aromatic cyclic ketonic compounds into aromatic hydroxylated compounds containing the same number of nuclear carbon atoms. A more specific object is to provide a novel method for the economic production of high yields of 3,5-dimethyl phenol, and the like, from the corresponding ketones containing a cyclic non-aromatic nucleus of six carbon atoms, e. g., isophorone and homo-isophorone.

It has now been discovered that the above and other objects may be attained by effecting the conversion in the presence of certain catalysts more fully described hereinbelow. It has also been discovered that the use of these catalysts brings the conversion of the aforementioned non-aromatic cyclic, and particularly mono-cyclic, ketonic compounds to form hydroxylated aromatic compounds containing the same number of nuclear carbon atoms, e. g., 3,5-dimethyl phenol from isophorone, within the field of practical utility so that technical scale production of the aromatic mono- or polyhydroxylated compounds, such as xylenols, may be readily and economically effected. The present process comprises the use of an activated alumina (such as one predominating in alumina alpha monohydrate and/or gamma alumina) which may or may not be impregnated with or contain substantial but lesser amounts of a metal or metal compound having catalytic dehydrogenating activity. The invention may therefore be generally stated to comprise the controlled catalytic conversion of non-aromatic cyclic ketonic compounds to aromatic hydroxy compounds containing the same number of nuclear carbon atoms by subjecting the above-mentioned and hereinbelow more fully described ketonic compounds, preferably in the vapor phase, to the action of an activated alumina which may or may not contain a metal or metal compound having catalytic dehydrogenating activity. The invention also comprises a process for the economic production of aromatic mono- or polyhydroxylated compounds by subjecting the corresponding ketonic compounds containing a cyclic non-aromatic nucleus of six carbon atoms, and particularly those already containing at least one double bond in the nucleus, in the vapor phase and at an elevated temperature, which is however below that at which substantial decomposition or destruction of the nuclear carbon structure occurs, to the influence or action of the aforementioned class of catalysts.

The process of the present invention is applicable to the treatment of the whole class of non-aromatic cyclic ketonic compounds. However, hydroxylated aromatic compounds are more readily obtained when the process is applied to the catalytic treatment or conversion of ketonic compounds in which the non-aromatic nucleus (which is preferably mono-nuclear) already contains at least one double bond. The process is also applicable to the catalytic conversion of the above-outlined class of cyclic compounds which contain a hydrogen atom attached directly to a saturated carbon atom which is adjacent to the carbonyl group. This is particularly true when the nucleus also contains a quaternary carbon atom. The following are illustrative examples of some of the non-aromatic cyclic ketonic compounds which may be catalytically treated in accordance with the process of the present invention to produce hydroxylated aromatics containing the same number of nuclear carbon atoms: isophorone, homo-isophorone, hydroxy isophorone, pulegone, menthone, alpha,gamma-bis (2-oxo-4-methyl-cyclohexyl) propane, 2,7-diketo-1,2,3,4,5,6,7,8-octohydro naphthalene, alpha-keto-tetrahydro naphthalene, gamma-dicarvelone, Buchu camphor and other diosphenols. The methyl groups in the various compounds of the above class, e. g., in isophorone, may be substituted by any alkyl radical, such as ethyl, n-propyl, isopropyl, n-butyl, isobutyl, amyl, etc. Also, the nucleus may contain unsaturated side chains, as in the case of carvone, as well as various other suitable substituents, such as hydroxy radicals, halogen atoms, and the like. The present process is however particularly applicable to the catalytic conversion of isophorone and of its homologues, e. g. homo-isophorone, to produce economically high yields of phenols.

It was stated above that activated alumina has been found to be an excellent catalyst for the above-defined conversion reaction. These activated, i. e., adsorptive, aluminas consist largely if not predominantly of alumina alpha monohydrate and/or gamma alumina, and are characterized by their highly active adsorptive properties. These activated aluminas may be prepared from the so-called "gamma" aluminas of the Haber system. Haber [Naturwiss. 13, 1007 (1925)] classifies the various forms of aluminas into two systems designated by him as the "gamma" and "beta" systems depending on their behavior upon heating. The "gamma" aluminas of the Haber classification comprise gamma alumina proper and all of the so-called hydrated aluminas which, upon heating, are converted to alpha alumina through the gamma form. On the other hand, the "beta" aluminas of the Haber system of classification comprise those aluminas such as diaspore which upon heating are converted directly to alpha alumina without going through the gamma form. The classification of aluminas into the two systems designated as "gamma" and "beta" systems according to Haber is not to be confused with the fundamental true alumina forms. This classification is merely for the purpose of dividing the common forms of alumina into two distinct groups. Thus, the various so-called hydrated aluminas which are classified as belonging to the "gamma" system in the Haber classification are totally distinct from the true gamma alumina, and diaspore is not a beta alumina.

The aluminas which upon heating are converted into alpha alumina through gamma alumina, which belong to the "gamma" system of the Haber classification, and which thus comprise or form the activated or adsorptive aluminas referred to hereinabove and in the appended claims, are:

1. The alumina alpha trihydrate, known as gibbsite or hydrargillite; this form is readily prepared synthetically and occurs in nature in the mineral, gibbsite, and as a component of certain bauxites;

2. The alumina beta trihydrate, known also as bayerite; it is isomorphous with hydrargillite; it does not occur naturally, but may be prepared synthetically by proper control of the precipitation conditions;

3. The alumina alpha monohydrate, known as böhmite, which is formed by the partial dehydration of either of the above two trihydrates;

4. Gamma alumina, which is a meta-stable anhydrous oxide, which, although it does not occur naturally, may be prepared by carefully controlled dehydration of any of the first three mentioned hydrates;

5. Gelatinous alumina hydroxide. This frequently encountered alumina is amorphous when freshly precipitated, but after aging the characteristic lines of böhmite can be detected by X-ray analysis. On further aging, the precipitate is gradually transformed to bayerite and finally to hydrargillite;

6. Bauxite, which is an ore of varied composition. The term "bauxite" was used in the older literature to designate the dihydrate; however, it is now known that bauxite consists of an extremely finely divided mixture of two or more of the known aluminas and certain argillaceous residues, and that no dihydrates of aluminas have ever been observed.

The physical, chemical and even the catalytic properties of the above and other adsorptive aluminas may vary within relatively wide limits depending on small variations in the processes and methods used in their preparation. A preferred type of activated or adsorptive alumina is prepared by dehydration of alumina trihydrate crystallized from alkali aluminate solutions. Of this type, a particularly suitable material is that prepared from massive alumina trihydrate, as for example the material described and claimed in U. S. Patents 1,868,869 and 2,015,593. Natural aluminas, such as bauxite, are generally not so efficient as the preferred synthetic aluminas due largely to the presence of appreciable percentages of iron, silica impurities, etc., which usually decrease their selectivity and increase cracking. However, certain selected bauxites, such as the activated bauxite sold under the trade-name of "Porocel," approach in efficiency the above preferred aluminas, and may be advantageously employed or even preferred as a catalyst in the present process in view of the considerably lower cost of such bauxites.

The various hydrated aluminas described above may be dehyrated, i. e., activated, to any desired extent. The maximum adsorptive capacity usually corresponds to a water content of between about 7% and about 12%. These materials are very suitable. However, it is found that the various aluminas may be rendered even more suitable by further dehydration to a water content of below about 6% in which case the aluminas exist predominantly in the form of the above described gamma alumina.

When a compound catalyst is employed in the execution of the process of the invention, such catalyst essentially comprises an activated or adsorptive alumina and a substantial but lesser amount of a metal or metal compound possessing catalytic dehydrogenating activity. Generally, in such compound catalyst, the activated alumina predominates gravimetrically, the metal or metal compound being incorporated in the surface of the alumina to form a compound catalyst possessing the desired reaction inducing qualities of both substances coupled with the physical structure and ultra-high porosity of the activated alumina. In some cases, the metal or metal compound which is thus incorporated in the surface of the activated alumina is in whole or in part in chemical combination with the activated alumina or at least the surface thereof. In other cases, these substances possessing dehydrogenating properties may be merely physically adherent to the surface of the activated alumina or deposited in some of the pores thereof. In still other cases, one or more of these metal or metal compounds may be in chemical combination with the surface of the activated alumina while one or more of such materials is adherent to the surface of the activated alumina or deposited in some of the pores thereof. The expression "incorporated in the surface of" the activated alumina, as used herein and in the appended claims, is intended to cover all of the above as well as other cases.

As stated, the material which is incorporated in the surface of an activated alumina to result in the compound catalyst used in the catalytic conversion of non-aromatic cyclic ketonic compounds into aromatic hydroxylated compounds containing the same number of nuclear carbon atoms comprises the general class of metals and metal compounds possessing dehydrogenating activity and therefore known as dehydrogenation catalysts. These materials may or may not be in chemical combination with the surface of the activated alumina. Suitable compound catalysts are those which comprise a metal or a metal compound such as metal oxide, sulfide, carbonate, chromate, chromite, molybdate, tungstate, and the like, incorporated in the surface of the activated alumina. For example, it was found that suitable catalysts are those which comprise a metal or a compound of a metal of the group consisting of nickel, iron, cobalt, manganese, vanadium, chromium, titanium, zirconium, cerium, osmium, zinc, uranium and tantalum incorporated in the surface of the activated alumina. A preferred sub-group of compound catalysts embraces those comprising an activated alumina and one or more iron, cobalt or chromium compounds. These metals may be present in the compound catalyst in any chemical combination either in a positive or negative state. A particularly preferred sub-group of compound catalysts embraces those comprising activated alumina and one or more oxides of iron, cobalt and/or chromium. Another sub-group comprises the sulfides of the metals of the left-hand series of group VI of the Periodic Table, as well as mixtures of these metal sulfides with other metal sulfides, e. g., tungsten sulfide-nickel sulfide catalyst, which may be supported on activated alumina.

The compound catalyst may be prepared in a variety of suitable manners, a convenient method comprising the impregnation of activated alumina with a solution, preferably an aqueous solution, of a compound of a metal which it is desired to combine with the activated alumina, and then drying at the desired temperature. Other convenient procedures are those disclosed in U. S. Patent 2,184,235. In any case, anyone skilled in the art may readily prepare a catalyst of any desired initial or final composition.

The catalyst may be employed in any desirable or suitable form, as for example in the form of granules, pellets, powders, etc., of any desired size. This solid catalyst, whether it consists of or comprises activated alumina or an activated alumina containing a dehydrogenaing catalyst of the class described herein, may be employed in manners customary in catalytic processes of this general type. Usually the desired quantity of the catalytic material which, as stated, may be in the form of particles or granules of the desired size is packed into a suitable reaction tube or reaction chamber of any appropriate size and of any suitable material. The catalytic material may be maintained at the desired operating temperature, for example by suitable external heating means, while the ketonic material, either in the liquid or vapor phase but preferably in the vapor phase, is passed through said chamber at desirable or optimum space velocities and under desirable temperature and pressure conditions. The term "space velocity," as employed herein, may be defined as the number of moles of the gaseous or vaporous starting material contacted with a liter of the catalyst per hour.

The space velocities to be employed in any particular case depend at least in part upon the activity of the particular catalyst, the specific non-aromatic cyclic ketonic compound or mixture of such compounds to be converted to the corresponding hydroxylated aromatic substances, and upon other operating conditions, especially the temperature employed, as well as upon the desired production rate. The space velocity and the temperature may be controlled or regulated for the specific substance treated and/or catalyst employed so as to obtain practical conversions at a practical rate while substantially avoiding or at least greatly inhibiting various undesirable side reactions such as the decomposition or rupture of the nuclear carbon structure. Although the space velocities may be varied within relatively wide limits, it has been found that satisfactory results are obtainable with space velocities ranging from about 2 to about 75. The preferred space velocities, particularly for the production of xylenols from isophorone, are in the range of from about 8 to about 40 at temperatures of from about 450° C. to about 550° C.

The preferred temperature range for effecting the catalytic conversion in accordance with the present process is between about 400° C. and about 650° C., optimum yields of 3,5-xylenol having been obtained when isophorone was treated at temperatures of between about 400° C. and about 550° C., while space velocities of between about 8 and 40 were employed. However, in some cases, higher or lower temperatures may be employed. Generally speaking, at the lower temperatures the catalytic effect of the catalyst decreases to such a degree that uneconomically low space velocities may be required to obtain the desired degree of conversion. Very high temperatures are also to be avoided because of excessive decomposition of the nuclear carbon structure of the starting material. However, in some cases, and particularly with some of the compound catalysts, it may be desirable to employ temperatures above about 650° C. in which case the undesirable side reactions may be inhibited for instance by employing high space velocities. The process may be effected at any suitable pressure, and may be effected in a batch, intermittent or continuous manner. Since the reaction is preferably effected in the vapor phase, and since it is at least preferred to maintain the ketonic compounds at the reaction temperature for a predetermined limited period of time, it is generally preferred to carry out the process in a continuous manner, in which case the starting material may be vaporized in a separate chamber or the front section of the reaction chamber, and then passed through the reaction zone at the optimum temperature and the desired space velocity. As an alternative, the liquid starting material may be vaporized in the reaction chamber proper.

In some cases it may be desirable or even advantageous to employ an inert diluent for the purpose of, for example, equalizing the temperature in the reaction zone, promoting a more uniform reaction rate, restricting the amount of undesirable side reactions such as the disruption of the nucleus, and even for the purpose of increasing the catalyst life. Hydrogen, nitrogen, steam and even certain hydrocarbons are examples of such diluents which may be employed individually or in combination with each other or with other diluents and in amounts adapted to the particular feed material, residence time, temperature and specific catalyst employed.

The following examples are presented for the purpose of illustrating the specific and preferred embodiments of the present invention as particularly adapted to the catalytic conversion of isophorone to produce high yields of 3,5-dimethyl phenol. It is to be understood, however, that there is no intention of being limited by the specific conditions disclosed in said examples.

All of the runs described hereinbelow were effected in an electrically heated tubular seamless iron vessel in which the massive catalyst was disposed. Both ends of the vessel were not heated and did not contain any catalyst. The preheated isophorone was conveyed at a predetermined rate through this vessel and in contact with the specific catalyst maintained at a given temperature. The reaction products were then conducted through a water cooled condenser, and the liquid product thus formed was, in each case, analyzed to determine the total conversions and the yields of the phenols, e. g., xylenol.

Example I

A catalyst comprising ferric oxide incorporated in the surface of activated alumina was used, the reaction tube temperature being maintained at about 500° C. Preheated isophorone was conveyed in a vapor state through the reaction zone and in contact with the compound catalyst at a rate of 33.6 mols per liter of catalyst per hour, i. e., at a space velocity of 33.6. An analysis of the reaction products showed that about 40% by weight of the isophorone reacted, and that about 84% by weight of the products of reaction consisted of phenols predominating in 3,5-dimethyl phenol.

Example II

The catalyst and reaction temperature were the same as those employed in the previous example. However, in this run the space velocity of the isophorone conveyed therethrough was reduced from the 33.6 employed in Example I to 8.4. An analysis of the reaction products showed a conversion of about 62% by weight of the introduced isophorone. Approximately 75% by weight of the reacted isophorone was converted to phenols.

A comparison of the above two runs shows that the space velocity employed in the first run was somewhat too high. However, the lowering of the space velocity to that employed in the second run, although increasing the total conversion, also increased somewhat the formation of by-products. This may be readily gleaned from a comparison of the percentages of the reacted isophorone which went to the formation of the desired phenols.

Example III

Isophorone was conveyed through the above-described reactor maintained at a temperature of about 500° C. and containing a highly dehydrated activated alumina predominating in gamma alumina. The space velocity of the preheated isophorone vapors was equal to about 25.2. An analysis showed that about 55% by weight of the introduced isophorone reacted. The yield of phenols was equal to about 73%.

Example IV

The catalyst comprised cobalt oxide incorporated in the surface of activated alumina. This catalyst was disposed in the above-mentioned reactor maintained at a temperature of about 500° C. Isophorone vapors were conveyed therethrough at a space velocity of 16.8. Upon analysis, it was found that a 68% by weight conversion of the isophorone was effected. The yield of phenols was equal to about 71%.

Example V

The catalyst employed in this run was similar to that used in Examples I and II. The reaction temperature was also maintained at about 500° C. However, instead of passing isophorone alone, this latter was conveyed through the reactor (and in contact with the catalyst) together with water (steam). The mol ratio of isophorone to water was equal to 8.4:24.2, the space velocity of this mixture being equal to about 32.6. It was found that approximately 72% by weight of the introduced isophorone reacted. The yield of phenols was about 82%.

A comparison of this run with that described in Example II shows the advantages of effecting the catalytic conversion reaction according to this process in the presence of an inert diluent, such as steam.

Example VI

The catalyst employed consisted of an activated alumina predominating in alumina alpha monohydrate and containing at least some gamma alumina. The catalyst bed in the reaction zone was maintained at a temperature of about 550° C., and a preheated and vaporized mixture of isophorone and water (in a mol ratio of 8.4:24.2) was conveyed therethrough at a space velocity of about 32.6. It was found that about 90% by weight of the introduced isophorone reacted, the yield of phenols being about 63%.

Analysis of the phenols formed in the above-described runs showed that, on an average, xylenol (3,5-dimethyl phenol) comprised between about 90% and 92% by weight thereof. The overall conversions and yields of the desired xylenol may be further increased by recycling the unreacted isophorone through the reaction zone.

Example VII

The catalyst employed in this run consisted of activated (adsorptive) alumina containing ferric oxide disposed in a reactor and maintained at a temperature of about 500° C. throughout the conversion reaction. Homo-isophorone was then vaporized and conveyed in the vapor state through the reactor at a space velocity of about 20 (i. e., 20 mols of homo-isophorone per liter of catalyst per hour). It was found that about 47% of the homo-isophorone was converted to phenols.

In the same manner a $C_{12}$ ketone produced by the condensation of four molecules of acetone and containing a six carbon atom nucleus and a single nuclear double bond, was subjected to the action of an adsorptive alumina at an elevated temperature of about 500° C. This also produced phenolic compounds.

The catalysts employed for the catalytic conversions in accordance with the process of the present invention are relatively stable under the conditions of their practical use, and may therefore be continuously employed over relatively long periods without any substantial decrease in their activity. However, with time they will gradually lose activity, this loss, in the absence of any specific poisons, being probably primarily due to deposition of carbon on the catalyst surfaces. It has been found that the original activity can be usually restored substantially completely by oxidizing the deposited carbon and thereby effecting its removal. It has also been found that this oxidation, which is preferably effected at temperatures which are not materially in excess of about 700° C., may be carried out without removing the spent catalyst from the reaction tube or chamber. This oxidation may be realized by using oxygen, air, or a mixture of air and an inert carrier, e. g., nitrogen, and by conveying this substance, at a suitable temperature and at an optimum space velocity, through the catalyst to be regenerated. The time of treatment necessary to restore the catalyst activity will depend upon various factors, e. g., conditions of the reactivation treatment, etc.

*Example VIII*

The catalyst employed in this series of runs comprised gamma alumina which had been already used for the catalytic conversion of isophorone to phenols predominating in 3,5-dimethyl phenol, and which had been reactivated by the passage of an air-nitrogen mixture thereover at a temperature of around 700° C. for a period of between about 1 hour and 1½ hours. Isophorone vapors were then conveyed through this regenerated catalyst bed at a temperature of about 500° C. at a space velocity of about 33.6. The reaction mixture showed a conversion of about 41% by weight and a phenol yield of about 68%.

The same catalyst was then used for twelve additional runs during which a total of slightly more than 10 kilograms of isophorone was treated. The catalyst volume was 80 cc. After each run the catalyst was again regenerated in the manner described above. After the last of said runs, the catalyst was again reactivated and then re-used under the identical conditions described hereinabove. It was found that, even after the repeated regenerations, the catalyst possessed the same degree of activity, the conversion of isophroone being equal to about 42 weight percent, and the yield of phenols being about 70%.

Although it is possible to treat the reaction products in a number of different ways to recover the phenols, and specifically 3,5-dimethyl phenol, therefrom, a preferred method includes the step of extracting the liquefied crude reaction product with an alkali solution, e. g., an aqueous sodium hydroxide solution. The alkaline solution of phenols thus formed may then be neutralized, as by carbon dioxide, hydrochloric acid, etc., to free the phenols, which may be recovered for example by ordinary distillation or even phase separation. In order to produce substantially pure 3,5-dimethyl phenol, the product obtained as a result of the mentioned distillation step may be dissolved in a suitable hydrocarbon fraction, e. g., octanes, and recrystallized therefrom by cooling to a suitable low temperature. Since isophorone is quite soluble in an aqueous solution of sodium phenates, and since unreacted isophorone is present in the liquid fraction removed from the aforementioned condenser which is attached to the exit from the reaction zone, it is necessary to extract the alkaline solution with a selective solvent, such as an aromatic hydrocarbon, e. g., benzene, or another organic solvent, such as a suitable ether or a saturated hydrocarbon, capable of selectively dissolving the isophorone. Several such extractions may be necessary because the phenols are usually distributed between the aqueous layer and the organic layer containing the isophorone.

We claim as our invention:

1. A process for the production of 3,5-dimethyl phenol from isophorone which comprises maintaining a catalyst essentially comprising gamma alumina in a reaction zone at a temperature of between about 400° C. and about 550° C., conveying a vaporous mixture comprising isophorone and steam through the reaction zone and in contact with said catalyst at a rate within the approximate range of between about 8 and about 40 mols of isophorone per liter of catalyst per hour, effecting the reaction at substantially atmospheric pressure, and separating 3,5-dimethyl phenol from the resultant reaction products.

2. A process for the production of 3,5-dimethyl phenol from isophorone which comprises maintaining a catalyst essentially comprising gamma alumina in a reaction zone at a temperature of between about 400° C. and about 550° C., conveying a vaporous mixture of isophorone and of a relatively inert diluent, substantially at atmospheric pressure through said reaction zone and in contact with said catalyst at a rate within the approximate range of between about 8 and about 40 mols of isophorone per liter of catalyst per hour, and separating 3,5-dimethyl phenol from the resultant reaction mixture.

3. A process for the production of 3,5-dimethyl phenol which comprises maintaining a catalyst predominating in gamma alumina in a reaction zone at a temperature of between about 400° C. and about 550° C., passing isophorone vapors at substantially atmospheric pressure through the reaction zone and in contact with said catalyst at a space velocity of between about 8 and about 40, and separating 3,5-dimethyl phenol from the resulting reaction mixture.

4. A process for the production of 3,5-dimethyl phenol which comprises maintaining a catalyst essentially comprising activated alumina predominating in alumina alpha monohydrate and gamma alumina at a temperature of between about 400° C. and 550° C., conveying isophorone vapors at substantially atmospheric pressure in contact with said catalyst at a space velocity of between about 8 and about 40, and separating 3,5-dimethyl phenol from the resultant reaction mixture.

5. A process for the production of 3,5-dimethyl phenol which comprises maintaining a catalyst essentially comprising an activated alumina and ferric oxide incorporated in the surface thereof at a temperature of between about 400° C. and 550° C., contacting vapors of isophorone with said catalyst at a rate of between about 8 and about 40 mols per liter of catalyst per hour, effecting the reaction at substantially atmospheric pressure, and recovering 3,5-dimethyl phenol from the reaction products.

6. A process for the production of 3,5-dimethyl phenol which comprises maintaining a catalyst essentially comprising activated alumina and a lesser but substantial amount of a compound selected from the group consisting of oxides of iron, cobalt and chromium, in a reaction zone and at a temperature of between about 400° C. and about 550° C., conveying isophorone vapors through said catalyst at a space velocity of between about 8 and about 40, and recovering 3,5-dimethyl phenol from the reaction products.

7. A process for the production of 3,5-dimethyl phenol which comprises maintaining a catalyst essentially comprising activated alumina and a lesser but substantial amount of a metal compound possessing dehydrogenating activity, in a reaction zone and at a temperature of between about 400° C. and about 650° C., conveying isophorone vapors through said reaction zone and in contact with the catalyst at a space velocity of between about 2 and about 70, and recovering 3,5-dimethyl phenol from the reaction products.

8. A process for the production of phenolic compounds from a ketone comprising one non-aromatic mono-unsaturated mono-cyclic nucleus of six carbon atoms and a ketonic oxygen atom directly attached to one of said carbon atoms, said nucleus having three alkyl groups attached thereto in the 3,5 and 5 positions, respectively, and having a hydrogen atom attached to a saturated carbon atom which is adjacent to the carbonylic group, which comprises contacting the vapors of said ketone at a temperature of between about 400° C. and about 650° C. with a catalyst essentially comprising an activated alumina predominating in alumina alpha monohydrate and gamma alumina, and separating the resulting phenolic compounds from the reaction products.

9. A process for the production of 3,5-dimethyl phenol which comprises maintaining a catalyst essentially comprising activated alumina predominating in alumina alpha monohydrate and gamma alumina at a temperature of between about 400° C. and about 650° C., conveying isophorone vapors in contact with said catalyst at a space velocity of between about 2 and about 70, and recovering 3,5-dimethyl phenol from the reaction products.

DE LOSS E. WINKLER.
SEAVER A. BALLARD.